(12) United States Patent
Ghosh

(10) Patent No.: US 6,724,844 B1
(45) Date of Patent: Apr. 20, 2004

(54) METHOD AND DEVICE FOR IMPROVING DFE PERFORMANCE IN A TRELLIS-CODED SYSTEM

(75) Inventor: Monisha Ghosh, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/107,546

(22) Filed: Jun. 30, 1998

(51) Int. Cl.$^7$ .............................. H04B 1/10; H04N 5/21
(52) U.S. Cl. ........................................ 375/350; 348/607
(58) Field of Search .................................. 375/233, 229, 375/231, 232, 346, 348, 349, 350

(56) References Cited

U.S. PATENT DOCUMENTS

| | | | | | |
|---|---|---|---|---|---|
| 5,052,000 A | * | 9/1991 | Wang et al. | .................... | 371/43 |
| 5,293,402 A | * | 3/1994 | Crespo et al. | ................. | 375/14 |
| 5,572,262 A | | 11/1996 | Ghosh | .......................... | 348/607 |
| 5,784,415 A | * | 7/1998 | Chevillat et al. | ............ | 375/341 |
| 6,012,161 A | * | 1/2000 | Ariyavisitakul et al. | ..... | 714/795 |
| 6,134,265 A | * | 10/2000 | Long | ............................ | 375/222 |

OTHER PUBLICATIONS

"Delayed Decision–Feedback Sequence Estimation", By Alexandra Duel–Hallen et k\al., IEEE Transactions on Communications, vol. 37, No. 5, May 1989, pp. 428–436.
Adaptive Signal Processing, by Bernard Widrow et al., pp. 99–115.

* cited by examiner

Primary Examiner—Stephen Chin
Assistant Examiner—Lawrence Williams
(74) Attorney, Agent, or Firm—Laurie E. Gatham

(57) ABSTRACT

A method and device for improving DFE performance in a trellis coded system by placing a short adaptive predictive filter after the DFE in order to whiten the error sequence at the output of the DFE.

6 Claims, 3 Drawing Sheets

METHOD AND DEVICE FOR IMPROVING DFE PERFORMANCE IN A TRELLIS-CODED SYSTEM

BACKGROUND OF THE INVENTION

1. Field of the Invention

The present invention is directed in general to digital signal processing, and in particular to receiver based methods and devices for improving decision feedback equalizer ("DFE") performance in a trellis coded system.

2. Background of the Invention

In many digital communication scenarios (e.g. telephone transmission, broadcast TV transmission, cable etc.) The transmitted signal arrives at the receiver through more than one path in addition to the direct path. This condition is called "multipath" and leads to intersymbol interference ("ISI") in the digital symbol stream. This ISI is compensated for in the receiver through an equalizer which in many cases is a DFE as shown in FIG. 1. U.S. Pat. No. 5,572,262 shows one method of combating these multipaths.

A DFE 10 (FIG. 1) has two filter sections, a forward filter 12 and a feedback filter 16. The input to the forward filter 12 is the received data which includes the transmitted symbol sequence $a_k$, noise $n_k$ and multipath $h_i$. The input to the feedback filter 16 is the quantized equalizer output $â_k$. The output of both the sections are summed 18 to form the final equalizer output $ã_k$ which is also the input to the next stage in a trellis-coded system, the trellis decoder. While a DFE performs better than a linear equalizer in severe ISI, the performance is limited by error propagation through the feedback filter 16 of the DFE 10. Error propagation occurs in the feedback filter 16 when the quantized equalizer output $â_k$ is not the same as the transmitted symbol $a_k$. If an error is made in determining the symbol $â_k$ at the output of the slicer 14, this incorrect symbol is fed back to the input of the feedback filter 16 and propagates. In many systems which employ error correction codes like trellis codes and/or Reed-Solomon codes to obtain very low error rates at moderate SNRs, the "raw" symbol error rate (SER) at the equalizer output can be extremely high. For example, in the VSB system, at threshold in white noise the SER at the equalizer output is about 0.2. The increased error propagation due to these high SERs can cause the DFE to lose a couple of dB in performance as compared to the case of no error propagation. Additionally, the error propagation causes the error sequence at the equalizer output to be correlated, since it depends on past incorrect symbol decisions. This correlation has an adverse effect on the subsequent trellis decoder which is usually designed for a white noise sequence.

SUMMARY OF THE INVENTION

Accordingly, it is an object of the invention to reduce the mean-squared-error (MSE) and correlation of the DFE output error sequence. This object is achieved by placing a short adaptive predictor filter after the DFE in order to whiten the error sequence. The ISI introduced into the data symbol stream by this filter is then compensated in the trellis decoder by the use of delayed decision feedback sequence estimation (DDFSE) as described in "Delayed decision-feedback sequence estimation," by A. Duel-Hallen and C. Heegard, IEEE Trans. Commun., vol. COM-37, no. 5, pp. 428–436, May 1989.

The invention has applications in any trellis coded system that utilizes a DFE for equalization, especially in cases where the SER after the equalizer is high and error propagation causes problems. An example is terrestrial transmission of digital TV signals.

The invention can also be used in trellis coded systems with DFEs which are subject to colored noise interference. Again, the DFE cancels much of the interference but the adaptive predictor serves to whiten the noise further. This helps improve the trellis decoder performance.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention reference will be had to the following drawings.

DETAILED DESCRIPTION OF THE PREFERRED EMBODIMENTS

Figure 1:
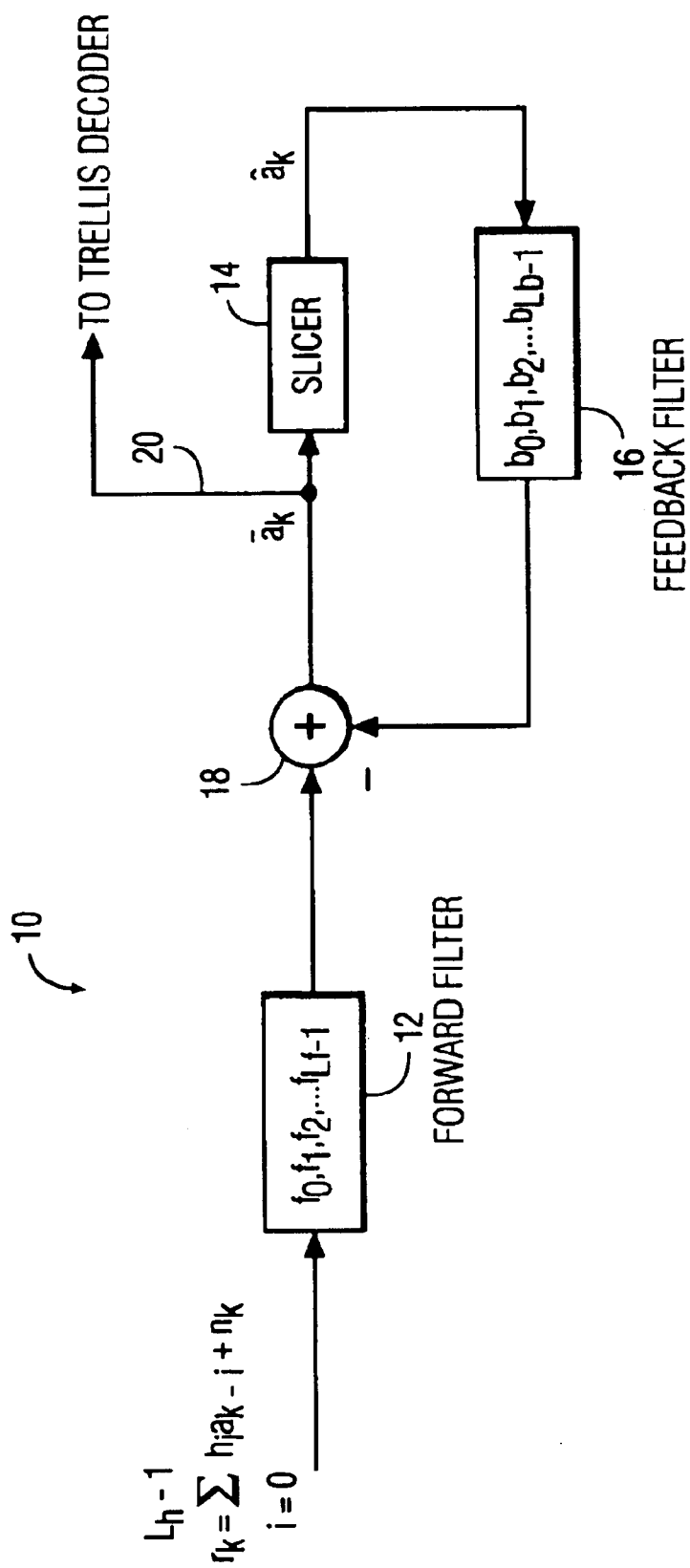
FIG. 1 shows a standard DFE.

FIG. 1 is a diagram of the standard decision feedback equalizer 10 (DFE). The DFE includes a forward filter 12, a slicer 14, a feedback filter 16 and a subtractor 18. Let $a_k$ be the transmitted trellis-coded symbol stream. The received signal $r_k$ after multi-path distortion and added noise $n_k$ can be written as $$r_k = \sum_{i=0}^{L_h-1} h_i a_{k+d_h-i} + n_k \tag{1}$$

where $h_i$, i=0 . . . $L_h$–1 is the multipath channel of length $l_h$ and delay $d_h$, and $n_k$ is the additive noise which in general is neither gaussian nor white. The forward filter 12 is used to remove the pre echo or ghosts in the received signal. The slicer 14 quantizes the signal $ã$ to the nearest symbol $â_k$. If an error is made in this quantization the error is passed to the feedback filter 16 and remains in the system. The output of the feedback filter 16 is subtracted from the output of the forward filter 12 to provide $ã_k$. $ã_k$ is an estimate of the transmitted symbol $a_k$ plus, an error $e_k$. It can also be expressed as:

$$ã_k = \sum_{i=0}^{L_f-1} f_i r_{k+d_f-i} - \sum_{i=1}^{L_b} b_i â_{k-d_b-i} \tag{2}$$

where $f_i$, i=0 . . . $L_f$–1 are the forward equalizer taps, $b_i$, i=1 . . . $L_b$ are the feedback taps, $d_f$ is the delay through the forward equalizer, $d_b$ is the delay in the feedback equalizer and $â_k$ is the constellation point closet to $ã_k$. In the absence of error propagation, i.e. if $â_k=a_k$, the error sequence $e_k$ at the equalizer output 20 is white. However, in most cases the error propagation causes this error sequence to be correlated, that is, the noise samples are no longer independent. The "colored" noise affects the performance of a trellis coder, because a trellis coder is optimized for performance in a channel having all white guassian noise.

Figure 2:
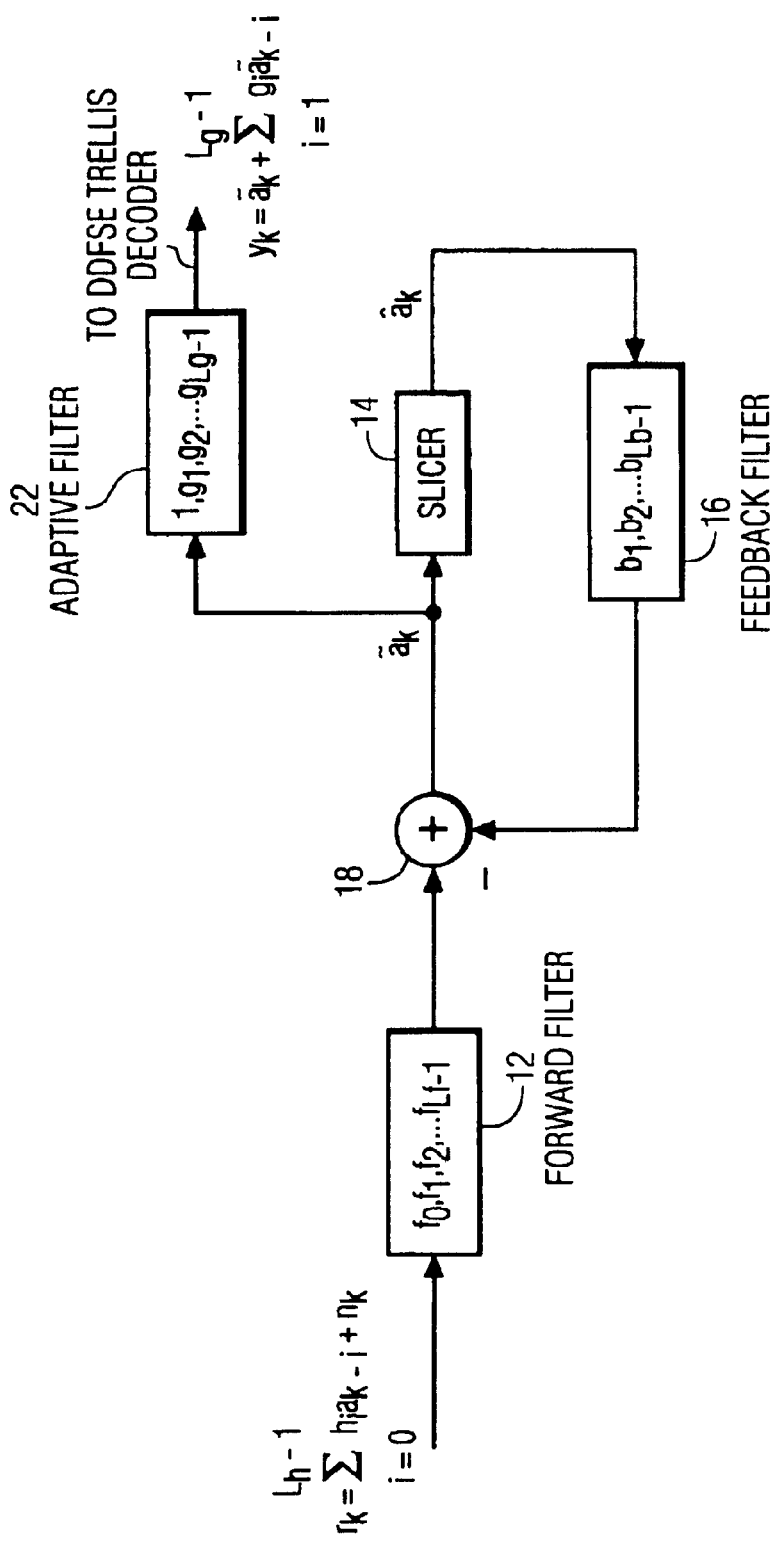
FIG. 2 shows a DFE in accordance with the invention.

In accordance with the invention, as shown in FIG. 2, an adaptive filter 22 is placed at the output of the DFE 10 but before a trellis decoder (not shown). The output of filter 22 can be expressed as $$y_k = \tilde{a}_k + \sum_{i=1}^{L_g} g_i \tilde{a}_{k-i} \qquad (3)$$

where $(1, g_1, g_2, g_3 \ldots g_{L_g})$ are the taps of the adaptive filter. Since $\tilde{a}_k = a_k + e_k$, then the adaptive filter output can be written as $$y_k = a_k + \sum_{i=1}^{L_g} g_i a_{k+i} + e_k + \sum_{i=1}^{L_g} g_i e_{k-i} \qquad (4)$$

$$= a_k + \sum_{i=1}^{L_g} g_i a_{k+i} + e'_k$$

If the filter taps are chosen so as to minimize the variance of $e'_k$, the SNR of the sequence $y_k$ can be improved. In addition, since $e'_k$ is the prediction error sequence of the equalizer output error sequence $e_k$, it will be white see Widrow and Stearns, "Adaptive Signal Processing," (hereby incorporated by reference), at pages 99–116), which does not affect the performance of a trellis decoder.

Training of the Adaptive Filter

Figure 3:
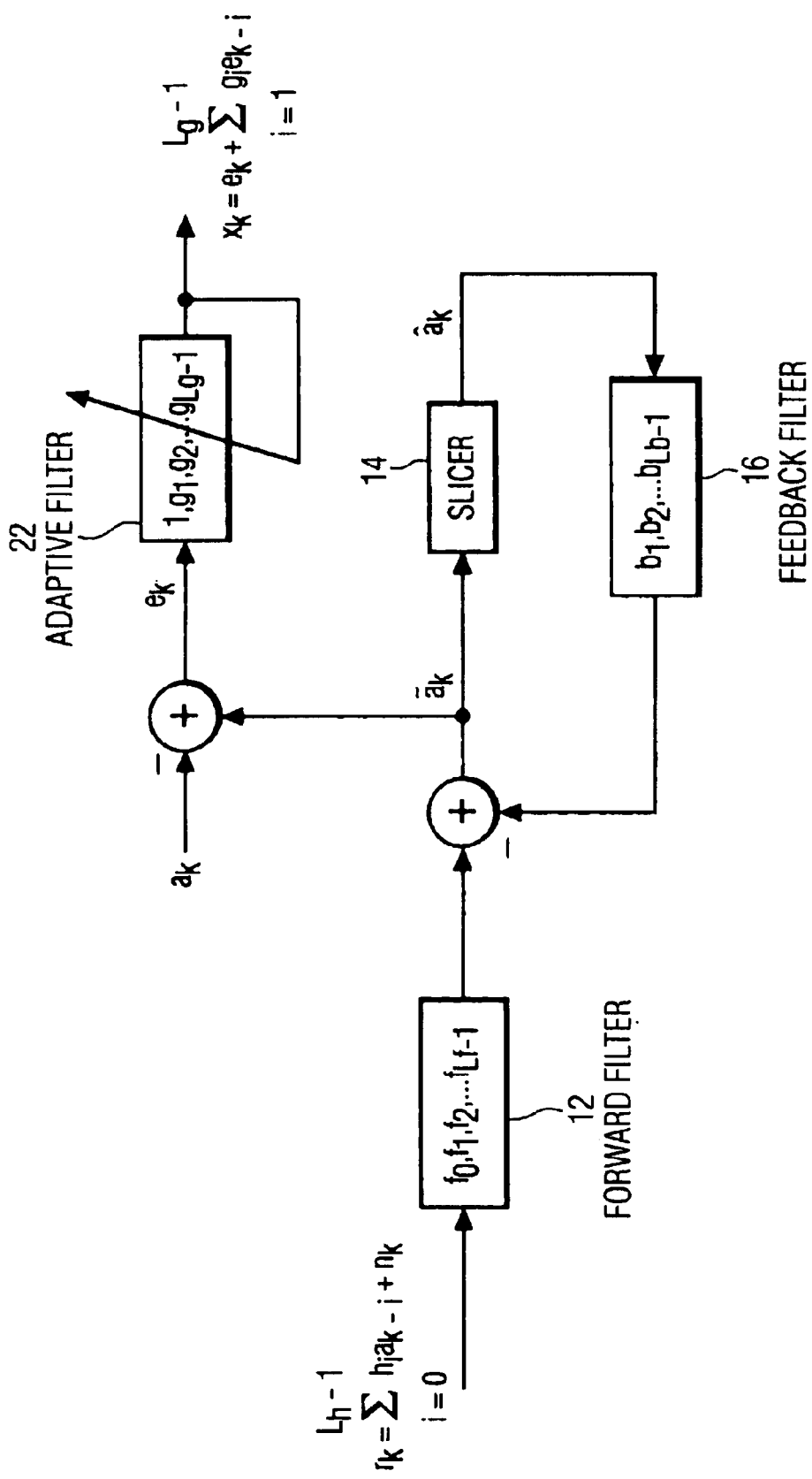
FIG. 3 shows a DFE in accordance with the invention during a training sequence.

To minimize the error from the output of the DFE, or in other words to tune the adaptive filter taps g to the error $e_k$, the adaptive filter 22 is first placed through a training sequence as shown in FIG. 3. In many applications, such as digital TV, the training sequence is part of the transmitted signal. After the equalizer 10 has converged (via blind means, without using the signal $a_k$, or trained means which uses the signal $a_k$) the adaptive filter 22 receives a training sequence which is the difference between the output of the DFE $\tilde{a}_k$ and the transmitted symbol sequence $a_k$. This difference is the error $e_k$ produced by the DFE.

$$\tilde{a} - a_k = e_k \qquad (5)$$

This error sequence $e_k$ is then input into the adaptive filter 22. The adaptive filter 22 forms an output sequence $x_k$ as shown in FIG. 3, where $$x_k = e_k + \sum_{i=1}^{L_g} g_i e_{k-i} \qquad (6)$$

The filter taps $g_k$ are adapted using the LMS algorithm as follows $$g(k+1) = g(k) - \mu x_k \underline{e}(k) \qquad (7)$$

where $\underline{g} =$ and $\underline{e}(k) = e_{k-1}, e_{k-2}, \ldots e_{k-L_g}]$. This adaptation adapts the filter taps to minimize the mean squared, error $e_k^2$, of the DFE.

Since the trellis decoder uses the taps $[g_1, g_2, \ldots g_{L_g}]$ in a feedback loop, error propagation can also occur hence it is also beneficial to limit the size of the taps g during adaptation, so that the trellis decoder that uses these taps does not suffer error propagation. If g is too small, however, the efficiency of the adaptive filter is reduced. Accordingly, an additional power constraint is imposed on the LMS algorithm to limit the amplitude of the taps which reduces the error propagation in the DDFSE trellis decoder (described next). A parameter P is chosen such that it is required that $$\sum_{i=1}^{L_g} g_i^2 \leq P \qquad (8)$$

At each step of the LMS algorithm this condition is tested, and if violated, the taps are rescaled appropriately.

The Adaptive Filter and DDFSE

Once the adaptive filter 22 is appropriately trained to minimize $e_k$, $\tilde{a}_k = a_k + e_k$ is input to the adaptive filter 22. The adaptive filter 22 although it has been trained to minimize $e_k$, it will also distort $\tilde{a}_k$. Equation 9 shows this distortion and represents the output of adaptive filter 22 as follows:

$$y_k = \tilde{a}_k + \sum_{i=1}^{L_g} g_i \tilde{a}_{k-i} \qquad (9)$$

As stated above, if the filter taps g are chosen to minimize $e_k$, the SNR of the sequence $y_k$ can be improved. $y_k$, however, is a distorted $\tilde{a}_k$ and includes the ISI introduced into the data stream by the adaptive filter 22. This distortion is then compensated for in the trellis decoder by use of delayed decision feedback sequence estimation (DDFSE)as described in A. Duel-Hallen and C. Heegard, "Delayed decision-feedback Sequence Estimation," IEEE Trans. Common., Vol. Com-37, no. 5, pp. 428–436, May 1989, hereby incorporated by reference, and as summarized below.

From the definition of $y_k$, we see that an optimum trellis decoder which will remove the distortion of $\tilde{a}_k$, should minimize the metric (maximum likelihood decoding):

$$\sum_k \left[ y_k - a_k - \sum_{i=1}^{L_g} g_i a_{k-i} \right]^2 \qquad (10)$$

This equation, however, requires past symbol sequences $a_{k-i}$ to be saved, and each tap $g_i$ in the adaptive filter therefore introduces more memory into the system which causes the number of steps of a trellis decoder to grow exponentially with the number of taps in the adaptive filter 22. Therefore an expanded trellis is necessary to accommodate the memory ($a_{k-i}$) introduced by the adaptive filter 22.

A suboptimum, but computationally less intensive way of performing the trellis decoding is to instead minimize the following metric:

$$\sum_k \left[ y_k - a_k - \sum_{i=1}^{L_g} g_i \hat{a}_{k-i,j} \right]^2 \qquad (11)$$

where the sequence $\tilde{a}_{k-i,j}$, $i=1, \ldots L_g$ is the survivor symbol sequence associated with state j in the trellis. This scheme does not expand the number of states in the original trellis, but instead introduces decision-feedback in each of the trellis states. That is, since this scheme uses $\tilde{a}_{k-i}$, which is merely an estimate of, rather than the actual value $a_{k-i}$, there is no memory introduced into the system. Since there is no memory, an expanded trellis is not required, i.e. the number of states in the trellis remains the same even with the additional adaptive filter 22.

There is the possibility of error propagation in this implementation and hence the precaution is taken in the LMS algorithm of limiting the amplitude of the filter taps. The optimum value of P will depend on the trellis code and application. In the United States HDTV example, simulation results indicate that a value of P=0.15 gives good performance.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A receiver based decision feedback equalizer (DFE)and trellis decoder, comprising:
    an input which receives an input signal comprising a transmitted symbol stream from a transmission system, noise and multipath intersymbol interference;
    a DFE output which provides a DFE output signal;
    a forward filter which filters the input signal;
    a decision feedback loop comprising a subtractor, a slicer, and a feedback filter, wherein the subtractor is coupled to both an output of the forward filter and an output of the feedback filter and subtracts the output of the feedback filter from the output of the forward filter to provide the DFE output signal which is applied to an input of the slicer;
    an adaptive filter, having an input coupled to the output of the subcontractor to adaptively filter the DFE output, and whiten an error in the DFE output signal which causes ISI; and
    a trellis decoder, coupled to the output of the adaptive filter which compensates for the ISI introduced by the adaptive filter.

2. The DFE as claimed in claim 1, further including a training device which trains the adaptive filter to minimize the mean squared error in the DFE output.

3. A method of decision feedback equalizing and trellis decoding in a receiver, comprising the steps of:
    receiving an input signal comprising a plurality of transmitted symbols from a transmission system, noise and multipath intersymbol interference, the symbol stream being undistorted prior to being transmitted;
    forward filtering the received signal using a forward filter having a plurality of taps;
    subtracting from the forward filtered signal a feedback filtered signal to provide a decision feedback output;
    quantizing the decision feedback output to the nearest symbol to provide a quantized output;
    feedback filtering the quantized output to provide the feedback filtered signal;
    adaptively filtering the decision feedback output to whiten an error in the DFE output which causes ISI;
    in a trellis decoder and compensating for the ISI introduced by adaptively filtering.

4. A receiver based DFE, and trellis decoder comprising:
    a forward filter having an input which receives an input signal and a forward filter output, the input signal comprising a transmitted symbol stream transmitted from a transmission system, noise and multipath intersymbol interference;
    a subtractor having a first input coupled to the forward filter output and having a second input and a subtractor output;
    a slicer having an input coupled to the output of the subtractor;
    a feedback filter coupled to the slicer output and the second input of the subtractor;
    an adaptive filter coupled to the output of the subtractor and whitening an error in the subtractor output which causes ISI; and
    a trellis decoder coupled to the adaptive filter, which compensates for the ISI introduced by the adaptive filter.

5. A television receiver, including a DFE and a trellis decoder, comprising:
    a forward filter, having an input for receiving an input signal and a forward filter output, the input signal comprising a transmitted symbol stream from a transmission system, noise and multipath intersymbol interference;
    a subtractor having a first input coupled to the forward filter output and having a second input and a subtractor output;
    a slicer having an input coupled to the output of the subtractor;
    a feedback filter coupled to the slicer output and the second input the of subtractor;
    an adaptive filter having an input coupled to the output of the subtractor, the adaptive filter whitening an error within the output of the subtractor which causes ISI; and
    a delayed decision feedback sequence estimator (DDFSE) having an input coupled to an output of the adaptive filter which compensates for the ISI introduced by the adaptive filter.

6. A receiver based device for improving DFE performance, comprising:
    DFE means having an input for receiving an input signal and an output for providing a DFE output signal, the input signal comprising a transmitted symbol stream from a transmission system, noise and multipath intersymbol interference, the symbol stream undistorted prior to being transmitted;
    adaptive filter means coupled to the output of the DFE for adaptively filtering the DFE output signal and thereby whitening error in the DFE output signal which causes ISI; and
    a trellis decoder means coupled to the adaptive filter means for trellis decoding and compensating for the ISI introduced by the adaptive filter means.

* * * * *